United States Patent [19]

Kupcikevicius

[11] Patent Number: 4,521,938
[45] Date of Patent: Jun. 11, 1985

[54] CASING SIZING MEANS, METHOD AND APPARATUS

[75] Inventor: Vytautas Kupcikevicius, Chicago, Ill.

[73] Assignee: Union Carbide Corporation, Danbury, Conn.

[21] Appl. No.: 507,006

[22] Filed: Jun. 23, 1983

[51] Int. Cl.³ .............................................. A22C 11/00
[52] U.S. Cl. .................................... 17/49; 17/1 R; 17/41
[58] Field of Search ................... 17/41, 42, 49, 1 R

[56] References Cited

U.S. PATENT DOCUMENTS

| | | | |
|---|---|---|---|
| 3,457,588 | 7/1969 | Myles et al. ........................ | 17/41 |
| 3,553,769 | 1/1971 | Myles et al. ........................ | 17/49 |
| 4,202,075 | 5/1980 | Michel et al. ...................... | 17/41 |
| 4,317,256 | 3/1982 | Senders ............................... | 17/41 X |

FOREIGN PATENT DOCUMENTS 68190 1/1983 European Pat. Off. .
1177029 4/1965 Fed. Rep. of Germany .

Primary Examiner—Willie G. Abercrombie
Attorney, Agent, or Firm—Roger Aceto

[57] ABSTRACT

An adjustable sizing means for food casing includes a tubular member having latch means at each end for mounting the tubular member to a stuffing apparatus. A forward portion of the tube contains a plurality of slits which extend parallel to the longitudinal axis of the tubular member. These slits define fingers which are hinged at their ends and mid point so that axially compressing the tube causes the fingers to buckle outwardly to a casing expanding size.

15 Claims, 4 Drawing Figures

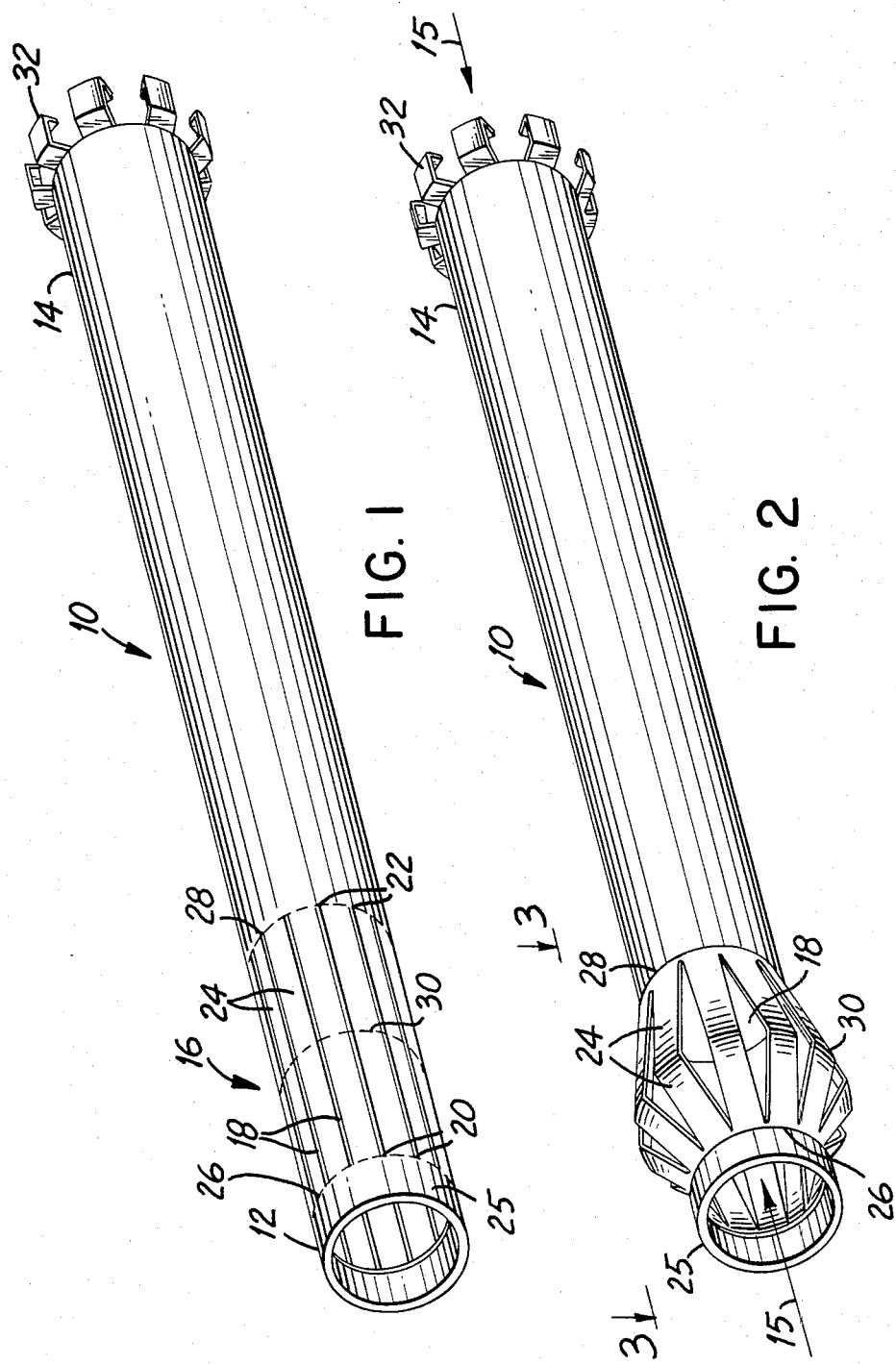

200 feet or more which is
CASING SIZING MEANS, METHOD AND APPARATUS

BACKGROUND OF THE INVENTION

The present invention relates to a sizing means, apparatus and method for sizing a flexible tubular food casing during the stuffing thereof. In particular, the present invention relates to an adjustable and reuseable sizing means together with a method and apparatus for using the sizing means.

Automatic and semiautomatic systems for stuffing food casings with a variety of food products are well known in the meat packing industry. For production of encased products on a fully automated basis, shirred casing is used. Shirred casing is a relatively long continuous length of casing of up to 200 feet or more which is shirred and compacted to a much shorter length.

It is also common to use a casing sizing means in connection with the stuffing of relatively large casings which, for example, may range between 50 and 200 millimeters in diameter. These casings have a relatively thick wall, often reinforced with a fibrous web. The stuffing of these larger casings is often facilitated by diametrically stretching the casing just prior to stuffing.

Sizing means as may be used to diametrically stretch the casing perform several important functions. For example, stretching the casing to a correct diametrical size during the stuffing operation facilitates production of a stuffed casing product having a relatively uniform diameter throughout its length. This diametrical stretching can be accomplished by longitudinally passing the casing over the stationary sizing means and allowing the sizing means to stretch the casing to a predetermined diameter. This stretched casing diameter is related to the manufacturer's recommended stuffed diameter for a given unstretched casing size and is, or is near to, the final diameter of the stuffed product.

The friction between the longitudinally moving casing and stationary sizing means also creates an amount of drag or hold-back force on the casing. While this drag or hold-back, in part, contributes to the final diameter of the stuffed casing product, hold-back also determines the extent to which the casing is filled. In general, the greater the drag or holdback on the casing, the more fully stuffed and tightly packed the casing with the food product.

While diametrical sizing and holdback is desired to provide a uniform, fully stuffed encased product, there are times during the stuffing operation when the casing should be relatively free of the drag or hold-back force created by the sizing means. For example, during automatic stuffing operations using the larger sizes of casing, it may be periodically necessary to provide an amount of casing slack, as when the stuffing apparatus is operated to gather and close the casing around the ends of the stuffed product. Reducing the drag or hold-back force on the casing in order to slack the casing facilitates the gathering and closing operation.

Sizing means as used in stuffing the larger sizes of casing can have either a fixed diameter as shown for example in U.S. Pat. Nos. 4,007,761 and 4,335,488 or an adjustable diameter as shown in U.S. Pat. Nos. 3,457,588 and 4,202,075. The latter type, in turn, can comprise elements which are integral components of the stuffing apparatus (U.S. Pat. No. 3,457,588) or they can be attachable to the stuffing apparatus (U.S. Pat. No. 4,202,075).

In the present invention, the sizing means has the capability of expanding diametrically in order to provide the desired stretch and hold-back to the casing. Reversing this adjustment, that is, collapsing the sizing means reduces the hold-back force and provides slack casing as may be required for gathering and closing the casing over the ends of the encased food product.

In addition to these features, the sizing means of the present invention is readily adaptable to existing stuffing apparatus. When incorporated into a stuffing apparatus, the sizing means in its collapsed condition takes up little space around the stuffing horn so that even a shirred casing can be slipped over the stuffing horn. Thus the sizing means presents no problems with respect to the effort involved in locating a casing over the collapsed sizing means and onto the stuffing horn of such apparatus.

A still further feature of the present invention is that it is adaptable for implanting within a casing so that it can be sold together with the casing as a casing article. In this instance, the sizing means, together with the casing, is mounted to the stuffing apparatus and the sizing means operably connected to the apparatus so as to permit the sizing means to perform its sizing function during the stuffing of the casing.

SUMMARY OF THE INVENTION

The sizing means of the present invention may be characterized in one aspect thereof by a substantially rigid, tubular member of a size sufficient to fit slidably over a stuffing horn of a stuffing apparatus and within a casing to be stuffed, the tubular member having a diametrically expandable portion.

The expandable portion has a plurality of longitudinally extending sizing fingers formed from the wall of the tubular member by a plurality of slits spaced about the periphery of the tubular member, the slits extending generally longitudinally of the tubular member. Each sizing finger has a hinge at its ends and at an intermediate point, the hinges being arranged to permit the outward, in unison, movement of the midportion of each sizing finger responsive to an axial compression of said tubular member. These sizing fingers, when buckled outwardly, are radially expanded to a size sufficient to diametrically stretch a casing to be stuffed.

The stuffing apparatus of the present invention, in one aspect, would include a stuffing horn and a tubular member slidably mounted on the stuffing horn, the tubular member having a diametrically expandable portion adjacent its fore end which includes a plurality of sizing fingers formed by co-extensive, longitudinally extending slits in the tubular member. Hinges at the ends and middle of each finger are arranged to permit the mid-point of each finger to move outwardly, responsive to the axial collapse of the tubular member. Means on the tubular member and apparatus cooperate to cause the axial collapse of the tubular member and consequent expansion of the expandable portion by sliding one end of the tubular member axially along the stuffing horn towards the other end.

In its method aspect, the present invention would be characterized by the steps of (a) providing a plurality of longitudinally extending, substantially unyielding sizing fingers arranged about the outer periphery of a stuffing horn, each finger having an intermediate portion which is hinged for radial movement to a casing stretching position wherein the fingers are expanded so as to engage against the inner periphery of the casing to be stretched;

(b) fixing a first end of each finger with respect to the stuffing horn outlet;

(c) longitudinally adjusting a second end of each sizing finger towards the first end; and (d) flexing each intermediate portion radially outward to a casing stretching position in direct response to the longitudinal adjustment of the second end of each finger towards the first end.

DESCRIPTION OF DRAWINGS

FIG. 1 is a perspective view of the sizing means of the present invention with the sizing fingers in a collapsed position;

FIG. 2 is a view similar to FIG. 1 showing the sizing fingers in a radially extended position;

DESCRIPTION OF THE PREFERRED EMBODIMENT

Figure 3:
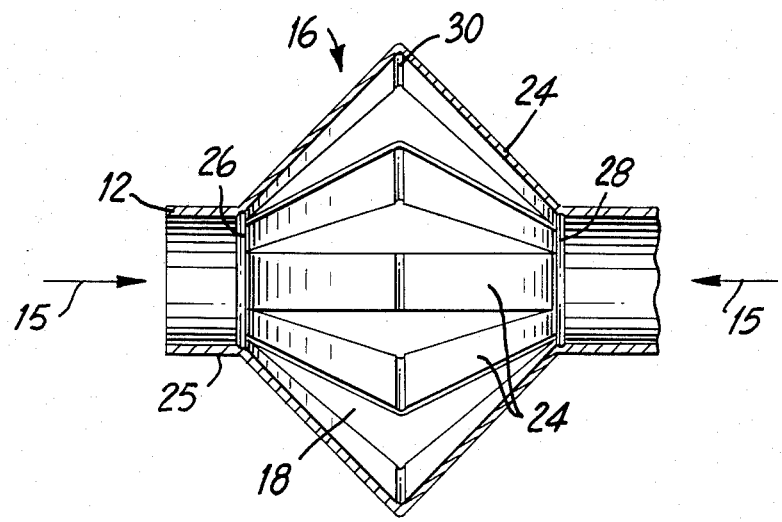
FIG. 3 is an enlarged sectional view taken along lines 3—3 of FIG. 2.

Referring to the drawings, FIG. 1 shows the sizing means of the present invention generally indicated at 10. The sizing means is in the form of an elongated tubular member having a fore end 12 and an aft end 14. The forward portion of the tube, that is, a portion adjacent the fore end 12, is indicated at 16. This forward portion 16 is the radially expandable portion of the sizing means.

The forward, or expandable portion 16, includes a plurality of longitudinal slits 18. The slits preferably are each parallel to the longitudinal axis of the tubular member and are generally coextensive, one with another. In this respect each of the slits begins at a point inboard of the fore end, as indicated at 20 and extends towards the aft end of the tubular member to a point indicated at 22. In this fashion, the slits 18 define a plurality of longitudinally extending fingers 24 arranged about the periphery of the tubular member. These fingers, being formed from a wall section of the tubular member, are arcuate in cross section.

Since slits 18 preferably do not extend through the fore end 12 of the tubular member, the fore end forms a continuous collar 25 which can function to attach the tubular member to the stuffing apparatus as further set out herein below.

Adjacent the end of each finger, is a flexible hinge 26, 28, respectively. In addition, each finger is provided with an intermediate hinge 30 at approximately the mid-point of each finger.

As best seen in FIG. 3, these hinges 26, 28 and 30 can be created by machining, cutting, or otherwise forming grooves of appropriate semi-circular cross section around the interior and/or exterior circumference of whatever tubing stock is used to fabricate the sizing means. In any event, these hinges should be arranged so as to permit the midpoint of each finger 24 to expand radially outward in response to an axial collapse of the tubular member. This collapse results from opposed, axially applied forces which effect a longitudinal movement of one end of the tubular member towards the other, as is shown by arrows 15 in FIGS. 2 and 3.

Completing the structure of the sizing means, FIG. 1 shows that the aft end of the tubular member is provided with an appropriate latch means 32. This latch, together with the collar 25, facilitates attachment of the tubular member to the stuffing apparatus as further described hereinbelow.

It should be appreciated that the tubular member is of a size which can be accommodated within the casing to be stuffed. In this respect, the casing can take the form of a relatively short cut length, or it can be a shirred, relatively long length of casing. In either event, the preferred unexpanded diameter of the tubular member is a size sufficient to fit within the casing so as to impart little or no stretch to the casing. Moreover, when unexpanded, as shown in FIG. 1, it is preferred that the tubular member present a uniform outer diameter which is as small as possible so that it can fit within a bore of a shirred casing.

In order to expand the diameter of the tubular member, its ends are axially collapsed each one towards the other. This causes the midpoint of each sizing finger to flex or move radially outward to a casing expanding position. Since the fingers are themselves substantially rigid members, radial expansion in this manner will cause the fingers to engage against the inner surface of the casing to stretch the casing to a desired diameter. The amount of radial expansion of the fingers is determined in part by the distance one end of the tubular member is moved toward the other.

Figure 4:
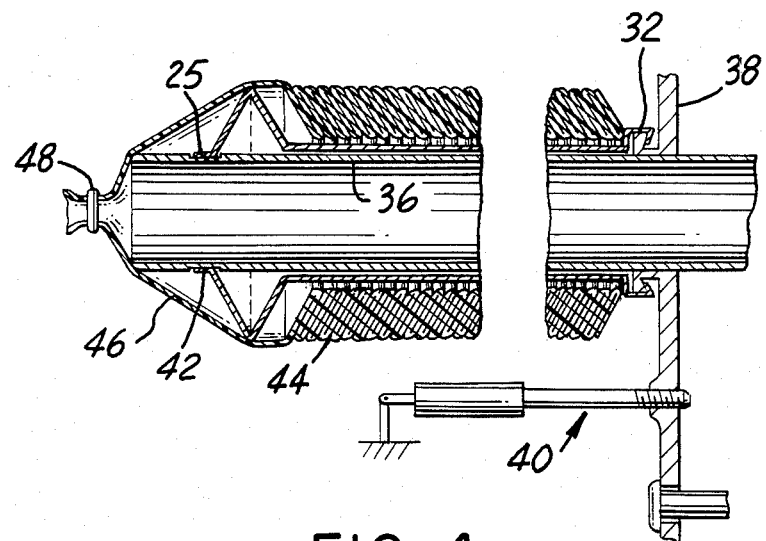
FIG. 4 is a side elevation view in section showing the sizing means of the present invention in place within a casing and on a stuffing machine in cooperative arrangement with other stuffing apparatus elements.

With reference to FIG. 4, the sizing means of the present invention is shown in operative association with a stuffing apparatus. The apparatus itself is well known in the art and only so much of the apparatus is shown as is necessary to illustrate the operation of the present invention. For example, a typical stuffing apparatus as may be modified to accommodate the sizing means of the present invention is shown in U.S. Pat. No. Re. 30,390.

Among the conventional components of the stuffing apparatus as shown in FIG. 4 is a stuffing horn 36 and a mounting plate 38. This mounting plate 38 is part of a slacker mechanism, a portion of which is shown at 40. The slacker mechanism 40 is capable of a controlled recriprocating motion as is conventional.

In use, the sizing means of the present invention is slidably mounted over the stuffing horn. The latch means 32 at the aft end of the tubular member is attached to mounting plate 38 by a snap connection. The fore end of the tubular member as defined by collar 25 is seated in a groove 42 formed about the outlet end of the stuffing horn. Thus, the collar 25 in effect constitutes a latch means on the fore end of the tubular member for attaching the fore end to the stuffing apparatus.

With the fore end of the tubular member fixed to the stuffing horn, it should be appreciated that any reciprocal, or longitudinal fore and aft movement of mounting plate 38 by slacker 40 will work to expand and/or contract the radially expandable portion 16 of the tubular member. For example, with mounting plate 38 moved to its extreme rearward position or to the right as shown in FIG. 4, sizing fingers 24 will assume a relatively flat or horizontal position.

In this position either a shirred length 44 of casing as shown in FIG. 4, or a cut length as desired, is installed over the stuffing horn. Thereafter, any forward movement of the mounting plate, or to the left as viewed in FIG. 4, will cause fingers 24 to expand to a casing engaging position as shown in FIGS. 2-4.

With the fingers in the expanded position, the stuffing operation will pull the casing across the expanded fingers and stretch the casing to the desired size just prior to the entry of the food product into the casing. At any time during the stuffing operation when it is desired to reduce the hold-back force caused by the sizing operation, such reduction can be accomplished simply by operating slacker 40 to move the mounting plate to the right as viewed in FIG. 4 so as to retract the sizing fingers from the inner surface of the casing.

As set out hereinabove, one advantage of the sizing means of the present invention is that it is adaptable for commericialization in one of several forms. For example, it can be sold as an integral part of the stuffing apparatus. In the alternative, it can be a separate member as described herein which is attachable to the apparatus and which is replaced only when necessary.

As a further alternative, the sizing means of the present invention can be implanted within a length of shirred casing and sold together with the casing as a casing article. As shown in FIG. 4, such an article would include a shirred length of casing 44 having the sizing means 10 of the present invention implanted within the bore of the casing. The fore end of the casing is preferably unshirred as shown at 46 and closed with a conventional clip closure 48.

In use, such an article including both the casing and sizing means, is loaded onto the stuffing horn and attached to the stuffing apparatus as described herein. In this situation it is anticipated that the sizing means would be a disposable item and used only with the length of casing forming the casing article.

While a preferred embodiment of the invention has been described, it should be appreciated that various modifications would be obvious to one skilled in the art. For example, while use of the invention has been described with respect to a fixed fore end and a movable aft end, it should be appreciated that the fore end could be made adjustable towards and away from a fixed aft end. Additionally, while intermediate hinge 30 is preferably at the midpoint of the fingers, it can be located away from the midpoint and positioned either closer to or further away from the fore end.

In another aspect, the sizing means of the present invention can be a tubular section only slightly longer than the radially expandable portion 16 (see FIG. 3). This shortened tubular section comprising the sizing means can be implanted into a casing article (as is the sizing disc shown in U.S. Pat. No. 4,007,761) or it can be kept apart from the casing and mounted to a stuffing horn before or after loading the casing to the stuffing horn.

In either case, the sizing means can be expanded and held in an expanded position by fixing both ends of the hinged fingers 24 to appropriate latch means on the stuffing horn as the sizing means is pushed onto the stuffing horn.

As an alternative, the aft end of such a shortened tubular section, as may be represented by hinged end 28 in FIG. 3, can be fixed to the stuffing horn while the fore end, as represented by hinged end 26, is free to move. A conventional machine element (as for example a snubbing ring as shown in U.S. Pat. No. 4,164,057) is then moved against the hinged fingers 24 to push the free fore end towards the fixed aft end thereby radially expanding the sizing means.

Having thus described the invention in detail, what is claimed as new is:

1. Sizing means for use in diametrically stretching a food casing prior to the stuffing thereof, said sizing means comprising:
   (a) a substantially rigid tubular member of a size sufficient to fit slidably over a stuffing horn of a stuffing apparatus and within a casing to be stuffed;
   (b) a plurality of longitudinally extending sizing fingers formed from the wall of said tubular member by a plurality of slits spaced about the periphery thereof, said slits being coextensive and extending longitudinally of said tubular member; and
   (c) hinge means intermediate the ends of each sizing finger, said hinge means being arranged to permit the in unison movement of a midportion of each of said sizing fingers to an outwardly spaced position responsive to an axial compression of said tubular member, said sizing fingers, with the midportions thereof spaced outwardly, being radially expanded to a size sufficient to diametrically stretch a casing to be stuffed.

2. Sizing means as set out in claim 1 wherein each of said sizing fingers is arcuate in cross section at said hinge means.

3. Sizing means as in claim 1 wherein each of said slits begin at a point inboard of an end of said tubular member, the portion of said tubular member forward of said point defining a continuous annular collar.

4. Sizing means as in claim 3 including latch means on said collar for fixing said end of said tubular member with respect to the longitudinal axis of said stuffing horn.

5. Sizing means as in claim 1 including latch means on both the fore and aft ends of said tubular member for releasably attaching said tubular member to a stuffing apparatus.

6. Sizing means as in claim 5 wherein said latch means adjacent said fore end fixes said fore end with respect to the longitudinal axis of said stuffing horn.

7. Sizing means as in claim 5 wherein said latch means adjacent said aft end is adapted to attach to a controllable reciprocating member of said stuffing apparatus for axially moving said aft end towards said fore end, thereby to axially collapse said tubular member and radially expand said sizing fingers.

8. Sizing means as in claim 1 wherein said hinge means is defined by grooves formed about the periphery of said tubular member intermediate the ends of said sizing fingers.

9. Sizing means as in claim 1 including hinge means at each end of said sizing fingers which connect said ends to adjacent portions of said tubular member.

10. Sizing means as in claim 1 wherein said tubular member is elongated with a fore end for disposition adjacent the discharge of a stuffing horn on which said sizing means is mounted, and an aft end, said sizing fingers defining an expandable portion of said tubular member adjacent said fore end.

11. Sizing means as in claim 1 wherein said tubular member is disposed within a shirred casing length prior to mounting said tubular member to said stuffing apparatus.

12. A shirred casing article comprising in combination:
   (a) a shirred casing length having an internal bore and including an unshirred portion of casing;
   (b) a tubular member disposed within said unshirred portion, said member being of a size sufficient to fit over a stuffing horn of a stuffing apparatus;

(c) a plurality of longitudinally extending sizing fingers formed from the wall of said tubular member by a plurality of slits spaced about the periphery thereof, said slits being substantially coextensive;

(d) hinge means intermediate the ends of each sizing finger, said hinge means being arranged to permit the in unison movement of a midportion of each sizing finger to a radially outward spaced position responsive to an axial compression of said tubular member, said sizing fingers, when at said position being radially expanded to a size sufficient to diametrically stretch said unshirred portion of casing; and (e) latch means on said tubular member for mounting said member to said stuffing horn.

13. A casing article as in claim 12 wherein said tubular member is elongated and extends through said internal bore, said sizing fingers being adjacent a fore end of such elongated tubular member and defining an expandable portion of said elongated tubular member within said unshirred portion of casing.

14. A casing stuffing apparatus including an expandable sizing means for diametrically stretching a food casing just prior to the stuffing of said casing, said apparatus comprising:

(a) a stuffing horn having an inlet and an outlet through which a food product passes;

(b) an elongated tubular member slidably mounted on said stuffing horn, said tubular member having a fore end, an aft end and a radially expandable portion adjacent said fore end;

(c) said radially expandable portion including a plurality of longitudinally extending sizing fingers formed by coextensive slits in said tubular member which are arranged about the periphery of said tubular member and which extend longitudinally of said stuffing horn;

(d) hinge means at the ends and intermediate the ends of each sizing finger, said hinge means being arranged to permit the in unison movement of a midportion of each sizing finger to an outwardly spaced position responsive to an axial collapse of said tubular member;

(e) cooperating means on said fore end and stuffing horn for fixing the fore end of said tubular member with respect to the longitudinal axis of said stuffing horn; and (f) means on said apparatus and engagable with the aft end of said tubular member for sliding said aft end longitudinally along said stuffing horn towards and away from said fore end, wherein the movement of said aft end towards said fore end causes the outward movement and radial expansion of said radially expandable portion to a size sufficient to expand a food casing to a selected, diametrical size.

15. A method of diametrically expanding a food casing about a stuffing horn outlet by engaging an expandable internal sizing means against the inner periphery of the casing, said method comprising the steps of:

(a) providing a casing article constituting a tubular member having an aft portion, a shirred casing on the aft portion with the shirred casing having an unshirred casing portion extending over a fore end of the tubular member, said member having adjacent its fore end a plurality of longitudinally extending, substantially unyielding sizing fingers arranged about the outer periphery of the stuffing horn, and formed from the wall of said tubular member by co-extensive longitudinal slits, each of said sizing fingers including an intermediate portion which is articulated for radial movement with respect to the longitudinal axis of said stuffing horn to and from a casing stretching position;

(b) mounting said casing article to said stuffing horn by fixing a first end of said tubular member with respect to the longitudinal axis of said stuffing horn;

(c) longitudinally adjusting a second end of said tubular member along said stuffing horn towards and away from said first end; and (d) flexing each of said sizing finger intermediate portions in unison radially outwardly against the inner surface of the unshirred casing portion to a casing stretching position in direct response to the longitudinal adjustment of said tubular member second end towards said first end, the amount of said radial movement being determined by the extent of said longitudinal adjustment.

* * * * *